United States Patent [19]

Saito

[11] 4,086,638
[45] Apr. 25, 1978

[54] DEVICE FOR FITTING A MAGNETIC HEAD OF A TAPE RECORDER

[75] Inventor: Shoichi Saito, Tokyo, Japan

[73] Assignee: Olympus Optical Co., Ltd., Tokyo, Japan

[21] Appl. No.: 797,688

[22] Filed: May 17, 1977

[30] Foreign Application Priority Data

May 17, 1976 Japan .............................. 51-62406[U]

[51] Int. Cl.² .......................... G11B 5/56; G11B 21/24
[52] U.S. Cl. .................................................... 360/109
[58] Field of Search ........................................ 360/109

[56] References Cited

U.S. PATENT DOCUMENTS

| 3,229,044 | 1/1966 | Kokke | 360/109 |
| 3,310,791 | 3/1967 | Fischer | 360/109 |
| 3,455,559 | 7/1969 | Wilson | 360/109 |

Primary Examiner—Robert S. Tupper

[57] ABSTRACT

A device for fitting a magnetic head of a tape recorder by an azimuth adjustment screw includes a head fixing plate with a projection integrally formed with one end thereof and a bonding agent for fixing the top of the azimuth adjustment screw integrally with the projection so as to prevent the screw from being turned.

7 Claims, 7 Drawing Figures

DEVICE FOR FITTING A MAGNETIC HEAD OF A TAPE RECORDER

BACKGROUND OF THE INVENTION

This invention relates to a device for fitting a magnetic head to a head base of a tape recorder, utilizing an azimuth adjustment screw.

The magnetic head of a tape recorder should be so positioned as to have its front face in parallel to the running magnetic tape and to assume a specific level with respect to the magnetic tape. If improperly positioned relative to the tape, the magnetic head will degrade very much the record and reproduction characteristics of the tape recorder. To adjust the position of the head, the head fixing plate to which the head is fixed is rockably attached to a head base which is fixed to the panel of the tape recorder, and an azimuth adjustment screw is provided between the head fixing plate and the head base. The azimuth adjustment screw is turned in one direction or the other to adjust minutely the level and inclination of the head with respect to the tape. After the head is set at the correct position in this way, a bonding agent such as "Locktite (trade name)" is applied to fix the head of the screw to the head fixing plate.

A portable tape recorder is liable to external shock and vibration. It often receives such enormous shock or vibration that the bonding agent peels off to loosen the azimuth adjustment screw. If this happens, the azimuth adjustment screw may turn by itself, and the magnetic head may therefore come out of the optimum position relative to the magnetic tape. Consequently, the azimuth adjustment screw has to be turned again so minutely as to set the head in the optimum position.

SUMMARY OF THE INVENTION

Accordingly, the object of this invention is to provide a device for fitting a magnetic head to a tape recorder, in which the bonding agent fixing the azimuth adjustment screw does not easily peel off even if shock or vibration is repeatedly applied to the tape recorder, whereby the magnetic head is held for a long time at the best possible position with respect to the tape.

DETAILED DESCRIPTION OF PREFERRED EMBODIMENTS

Figure 1:
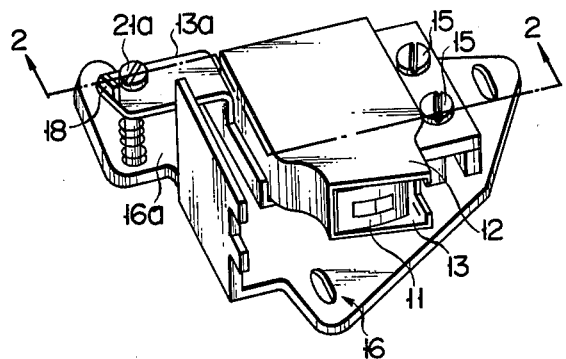
FIG. 1 is a perspective view of a device for fitting a magnetic head to a tape recorder according to an embodiment of this invention.
Figure 2:
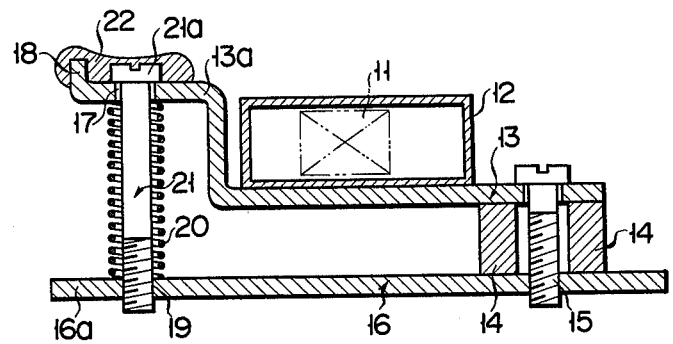
FIG. 2 is a cross-sectional view of the device of FIG. 1, taken along line 2—2 in FIG. 1.

As shown in FIGS. 1 and 2, a magnetic head 11 of well-known type is so placed in a non-magnetic head cover 12 that its front face or scanning face is directed to the opening of the cover 12. The cover 12 is fixed on the central part of a head fixing plate 13 which is also non-magnetic. The plate 13 has a pair of through holes near one of its ends. Through these holes two screws 15 are screwed into a head base 16. Between the plate 13 and the base 16 there are interposed a pair of metal spacers 14, which are so disposed as to sandwich the screws 15. Thus the metal spacers 14 and the screws 15 cooperate to support the head fixing plate 13 substantially parallel to the head base 16 and to space the same from the base 16 for a predetermined distance.

The head base 16 is fixed on the panel (not shown) of a tape recorder. The other end of the head fixing plate 13 is bent upwards substantially at right angle and is further bent in a substantially horizontal direction away from the magnetic head 11. The horizontally extending end portion of the plate 13 constitutes a fixing section 13a. The fixing section 13a is made vertically rockable a little about said one end of the head fixing plate 13. The fixing part 13a has a through hole 17. Formed integrally with the end of the fixing part 13 is a projection 18 which protrudes upwards. Preferably, the projection 18 is formed by bending upwards the end portion of the fixing part 13a.

Below the fixing part 13a the end portion 16a of the head base 16 extends substantially parallel to the fixing part 13a. The end portion 16a has a screw hole 19 which is positioned right below the through hole 17 of the fixing part 13a. Between the fixing part 13a and the end portion 16a a compression coil spring 20 is interposed in alignment with the through hole 17 and the screw hole 19. Through the hole 17 an azimuth adjustment screw 21 is inserted downwardly. The azimuth adjustment screw 21 extends through the coil spring 20, and its lower end is screwed in the screw hole 19 of the end portion 16a.

The head 21a of the azimuth adjustment screw 21 is placed on the fixing part 13a of the head fixing plate 13. Its periphery is faced to the projection 18 and spaced therefrom for a distance. If the head 21a is turned by, for example, a minus screw driver, the head fixing plate 13 is rocked a little in vertical plane. Thus the position of the magnetic head 11 can be adjusted minutely. Namely, if the screw 21 is turned in one direction and further threaded into the screw hole 19, the head fixing plate 13 is rocked counterclockwise in FIG. 2 against the force of the coil spring 20. If the screw 21 is turned in the opposite direction and unscrewed out of the screw hole 19, the plate 13 is rocked clockwise by the coil spring 20.

After the magnetic head 11 is set in the desired position in the above-mentioned manner, a proper bonding agent 22 is applied to cover up the projection 18 and the head 21a of the screw 21 as shown in FIG. 2. The head 21a of the azimuth adjustment screw 21 is thus fixed firmly to the fixing part 13a of the head fixing plate 13. The bonding agent 22 is either a paste or a liquid. If it is a paste, the bonding agent 22 is better pushed into the space between the projection 18 and the screw head 21a so as to fill up the space as well as onto them. If it is a liquid, it is better dropped between and onto the projection 18 and the screw head 21a, using an appropriate device, for example, a squirt. As bonding agent 22, use may be made of a well-known metal bonding agent such as epoxy resin, phenol resin and α-cyanoacrylate.

Since a mass of bonding agent 22 covers up the projection 18, the screw head 21a and the through hole 17, it is strongly sticked to the head fixing plate 13. Owing to the projection 18 the bonding agent 22 does not easily peel off the head fixing plate 13 in spite of external shock or vibration exerted on the tape recorder, unlike in the conventional head fitting device wherein no projection is formed on the end of the head fixing plate. The azimuth adjustment screw 21 would not therefore get loose to rotate by itself. Thus the magnetic head 11 can be kept at the best possible position with respect to the magnetic tape. Since the projection 18 can be easily be formed by bending up the end portion of the head fixing plate 13, it does not add to the cost of the device at all.

Figure 3:
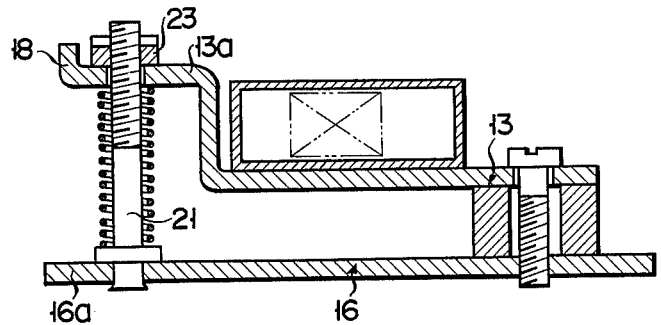
FIG. 3 is a cross-sectional view of another embodiment of the invention.

The azimuth adjustment screw 21 may be combined with a slotted nut 23, as shown in FIG. 3. In this case the lower end of the azimuth adjustment screw 21 is fixed to the end portion 16a of the head base 16 by means of coulking. The threaded upper end of the screw 21 extends upwards through the fixing part 13a and is threadedly engaged with the slotted nut 23. Thus, the inclination of the head fixing plate 13 is adjusted by turning the slotted nut 23. After the inclination adjustment of the head fixing plate 13, the bonding agent 22 is applied to fix the slotted nut 23 integrally to the projection 18.

Figure 4A:
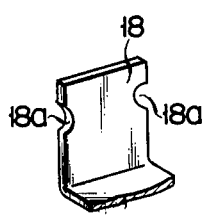
FIGS. 4a to 4c are perspective views for showing different configurations of a projection.
Figure 4B:
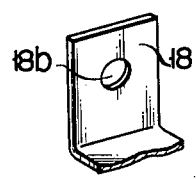
Figure 4C:
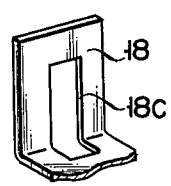
Figure 4D:
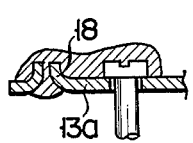
FIG. 4d is a cross-sectional view of another configuration of a projection.

The projection 18 formed integrally with the head fixing plate 13 may have such various configurations as shown in FIGS. 4a to 4d. It may have U-notches 18a on its lateral edges as illustrated in FIG. 4a or a round through hole 18b as shown in FIG. 4b. Further, it may have an elongate slit 18c which extends to the fixing part 13a of the head fixing plate 13 as illustrated in FIG. 4c. The projection 18 shown in FIG. 4d has a small hole, the rim of which is held up.

What is claimed is:

1. An adjustable mount for mounting a magnetic head of a tape recorder, to a panel of the tape recorder comprising a head base fixed on the panel of the tape recorder; a head fixing plate supporting the magnetic head; support means mounting one end of the head fixing plate above the head base; an azimuth adjustment screw having one end supported by the head base and the other end extended through the other end of the head fixing plate; urging means resiliently biasing said other end of the head fixing plate in the vertical direction away from the head base; rotating means disposed at the other end of the azimuth adjustment screw so as to cooperate, when turned, with the azimuth adjustment screw to move the head fixing plate vertically against the urging means; a projection integrally formed with the other end of the head fixing plate, said projection extending out of the plane of said other end of the head fixing plate; and a bonding agent fixing the rotating means integrally with the projection to prevent the rotating means from being turned.

2. A device according to claim 1, wherein said rotating means is integrally formed with said azimuth adjustment screw and forms a head thereof, and azimuth adjustment screw has its threaded portion screwed in said head base.

3. A device according to claim 2, wherein said urging means is a compression coil spring arranged between said head base and head fixing plate and in alignment with said azimuth adjustment screw.

4. A device according to claim 1, wherein said azimuth adjustment screw has its lower end fixed to said head base and its upper end threaded, and said rotating means is a nut threaded with the threaded portion of said azimuth adjustment screw.

5. A device according to claim 1, wherein said projection has U-notches on its lateral edges.

6. A device according to claim 1, wherein said projection has a through hole.

7. A device according to claim 1, wherein said projection has an elongate slit extending upwards.

* * * * *